United States Patent
Fulzele et al.

(10) Patent No.: US 11,436,262 B2
(45) Date of Patent: Sep. 6, 2022

(54) SYSTEM AND METHOD OF CREATING ENTITY RECORDS

(71) Applicant: Innoplexus AG, Eschborn (DE)

(72) Inventors: Nikhil Vinod Fulzele, Nagpur (IN); Arpan Sheetal, Haranganj (IN)

(73) Assignee: Innoplexus AG, Eschborn (DE)

( * ) Notice: Subject to any disclaimer, the term of this patent is extended or adjusted under 35 U.S.C. 154(b) by 833 days.

(21) Appl. No.: 16/366,365

(22) Filed: Mar. 27, 2019

(65) Prior Publication Data
US 2020/0089693 A1    Mar. 19, 2020

(30) Foreign Application Priority Data
Mar. 27, 2018 (GB) .................................. 1804935

(51) Int. Cl.
| | | |
|---|---|---|
| *G06F 17/00* | (2019.01) | |
| *G06F 16/28* | (2019.01) | |
| *G06F 16/23* | (2019.01) | |
| *G06F 16/25* | (2019.01) | |
| *G06N 5/00* | (2006.01) | |
| *G06N 5/04* | (2006.01) | |

(52) U.S. Cl.
CPC ........ *G06F 16/288* (2019.01); *G06F 16/2379* (2019.01); *G06F 16/258* (2019.01); *G06N 5/003* (2013.01); *G06N 5/04* (2013.01)

(58) Field of Classification Search
CPC .. G06F 16/288; G06F 16/2379; G06F 16/258; G06F 16/36; G06F 16/215; G06F 16/35; G06F 16/355; G06F 16/367; G06N 5/003; G06N 5/04
See application file for complete search history.

(56) References Cited

U.S. PATENT DOCUMENTS

| | | | |
|---|---|---|---|
| 8,266,168 B2 * | 9/2012 | Bayliss | G06F 16/245 |
| | | | 707/758 |
| 10,614,102 B2 * | 4/2020 | Tripathi | G06F 16/285 |
| 10,997,218 B2 * | 5/2021 | Tripathi | G06F 16/2365 |
| 2017/0155538 A1 * | 6/2017 | Tee | H04L 65/4038 |
| 2017/0286526 A1 * | 10/2017 | Bar-Or | G06F 16/288 |

* cited by examiner

*Primary Examiner* — Greta L Robinson
(74) *Attorney, Agent, or Firm* — Ziegler IP Law Group, LLC

(57) ABSTRACT

A system that creates entity records, wherein the system includes a computer system. The system includes: a database arrangement operable to store existing data sources and a processing module communicably coupled to the database arrangement. The processing module is operable to receive unstructured data from existing data sources; structure the unstructured data to obtain data-records, wherein the data-records comprise entity names and entity attributes associated with the entity names; bucket data-records into one or more buckets based on similar entity attributes thereof; create intermediate clusters including at least one of the one or more buckets based on a pattern recognition algorithm; calculate a prediction probability score associated with each of the data-records within the intermediate clusters; combine the data-records from the intermediate clusters to obtain an entity-record, wherein the combined data-records include a prediction probability score higher than a predefined threshold.

20 Claims, 2 Drawing Sheets

SYSTEM AND METHOD OF CREATING ENTITY RECORDS

CROSS-REFERENCE TO RELATED APPLICATIONS

This application claims the benefit under 35 U.S.C. § 119(a) and 37 CFR § 1.55 to UK Patent Application No. GB1804935.3, filed on Mar. 27, 2018, the entire content of which is incorporated herein by reference.

TECHNICAL FIELD

The present disclosure relates generally to data processing; and more specifically, to identification of entity attributes related to entity records. The present disclosure relates to systems that create entity records. Furthermore, the present disclosure relates to methods of (for) creating entity records. Moreover, the present disclosure also relates to computer readable medium containing program instructions for execution on a computer system, which when executed by a computer, cause the computer to perform method steps of creating entity records.

BACKGROUND

With a temporally exponential advancement in various fields of technology, innovation and development in such technology have also advanced, resulting in large quantities of data being created. Earlier, collection of data for research work was implemented by reading books and seeking advice from various experts of a given specific technical field. However, with technological evolution of various digital media, there has risen a major source of data crediting, thereby increasing accessibility and availability of credited data.

Generally, data available on various digital media platforms have a degree of redundancy associated therewith, and are often in a dense format; as a consequence, it is difficult to identify specific entities and records related to the data. Existing techniques for creating entity records require human intervention and labour for identifying specific entity records and information related thereto. Alternatively, the existing techniques require a list of entities related to required entity records (such as a person, a product, a disease and so forth), that has to be searched. Subsequently, the aforesaid existing techniques search for specific entity records by matching them with other entity records.

However, the existing techniques for creating entity records may suffer several performance issues, for example insufficient speed of response when generating search results, inefficient use of databases, inefficient use of data communication networks used to communicate data when performing such searching activities. Such performance issues may include ambiguous identification of similar entity names. Specifically, the existing techniques for creating entity records may not be able to separate distinctively two or more similar entity names related to contextually different data-records. Additionally, the existing techniques for creating entity records may require human intervention in order to remove such an ambiguity among identical or equivalent entity names by manually identifying contextual meaning thereof. Moreover, the existing techniques for creating entity records may not be capable of handling sparse data in an efficient manner. Furthermore, entity records that are created using the existing techniques for creating entity records may involve considerable data processing and time complexity as it includes ambiguous data therein; such considerable data processing and time complexity results in data processing arrangements operating with reduced performance, more energy dissipation and more wear-and-tear of data processing hardware. Consequently, such retrieval of data consumes a lot of human effort and time in order to verify and rectify errors from created entity records.

Therefore, in light of the foregoing discussion, there exists a need to overcome the aforementioned drawbacks associated with the existing techniques for creating entity records.

SUMMARY

The present disclosure seeks to provide a system for creating entity records, namely a system that creates entity records. The present disclosure also seeks to provide a method of (for) creating entity records. The present disclosure also seeks to provide a computer readable medium, containing program instructions for execution on a computer system, which when executed by a computer, cause the computer to perform method steps for creating entity records. The present disclosure seeks to provide an at least partial solution to the existing problem of ambiguity and complexity in creating entity records. An aim of the present disclosure is to provide a solution that at least partial overcomes the problems encountered in the prior art, and provides an optimal and efficient approach for creating entity records from existing data sources; the solution potentially results in more effective data processing to be achieved from data processing hardware, that potentially results in less energy dissipation within such data processing hardware.

In one aspect, an embodiment of the present disclosure provides a system that creates entity records, wherein the system includes a computer system that executes data processing tasks, wherein the system comprises:
 a database arrangement operable to store existing data sources; and
 a processing module communicably coupled to the database arrangement, the processing module being operable to:
  receive unstructured data from existing data sources;
  structure the unstructured data to obtain data-records, wherein the data-records comprise entity names and entity attributes associated with the entity names;
  bucket data-records into one or more buckets based on similar entity attributes thereof;
  create intermediate clusters comprising at least one of the one or more buckets based on a pattern recognition algorithm;
  calculate a prediction probability score associated with each of the data-records within the intermediate clusters; and
  combine the data-records from the intermediate clusters to obtain an entity-record, wherein the combined data-records comprise a prediction probability score higher than a predefined threshold.

In another aspect, an embodiment of the present disclosure provides a method of (for) creating entity records, wherein the method includes using a computer system that executes data processing tasks, wherein the method comprises:
 receiving unstructured data from existing data sources;

structuring the unstructured data to obtain data-records, wherein the data-records comprise entity names and entity attributes associated with the entity names;

bucketing data-records into one or more buckets based on similar entity attributes thereof;

creating intermediate clusters comprising at least one of the one or more buckets based on a pattern recognition algorithm;

calculating a prediction probability score associated with each of the data-records within the intermediate clusters;

combining the data-records from the intermediate clusters to obtain an entity-record, wherein the combined data-records comprise a prediction probability score higher than a predefined threshold.

In yet another aspect, an embodiment of the present disclosure provides a computer readable medium, containing program instructions for execution on a computer system, which when executed by a computer, cause the computer to perform method steps of a method of (for) creating entity records, the method comprising the steps of:

receiving unstructured data from existing data sources;

structuring the unstructured data to obtain data-records, wherein the data-records comprise entity names and entity attributes associated with the entity names;

bucketing data-records into one or more buckets based on similar entity attributes thereof;

creating intermediate clusters comprising at least one of the one or more buckets based on a pattern recognition algorithm;

calculating a prediction probability score associated with each of the data-records within the intermediate clusters; and combining the data-records from the intermediate clusters to obtain an entity-record, wherein the combined data-records comprise a prediction probability score higher than a predefined threshold.

Embodiments of the present disclosure substantially eliminate, or at least partially address, the aforementioned problems in the prior art, and enables an efficient and optimal approach for creating entity records.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
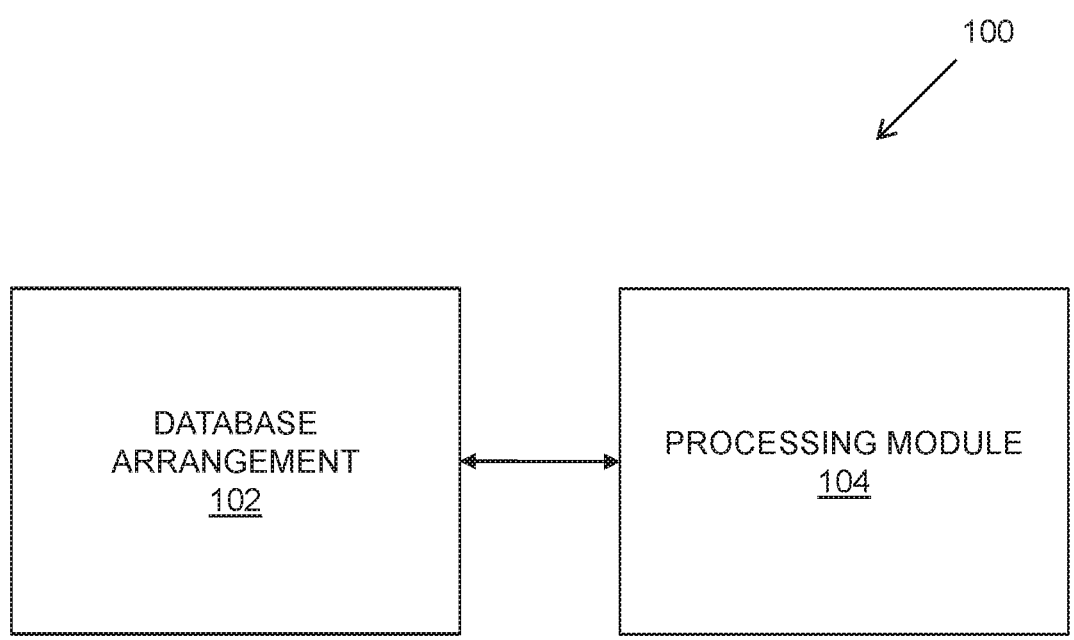
FIG. 1 is a block diagram of a system that creates entity records, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

In overview, embodiments of the present disclosure are concerned with entity normalization and specifically to identification of entity attributes related to entity records.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system that creates entity records, wherein the system includes a computer system that executes data processing tasks, wherein the system comprises:

a database arrangement operable to store existing data sources; and a processing module communicably coupled to the database arrangement, the processing module being operable to:

receive unstructured data from existing data sources;

structure the unstructured data to obtain data-records, wherein the data-records comprise entity names and entity attributes associated with the entity names;

bucket data-records into one or more buckets based on similar entity attributes thereof;

create intermediate clusters comprising at least one of the one or more buckets based on a pattern recognition algorithm;

calculate a prediction probability score associated with each of the data-records within the intermediate clusters; and combine the data-records from the intermediate clusters to obtain an entity-record, wherein the combined data-records comprise a prediction probability score higher than a predefined threshold.

In another aspect, an embodiment of the present disclosure provides a method of (for) creating entity records, wherein the method includes using a computer system that executes data processing tasks, wherein the method comprises:

receiving unstructured data from existing data sources;

structuring the unstructured data to obtain data-records, wherein the data-records comprise entity names and entity attributes associated with the entity names;

bucketing data-records into one or more buckets based on similar entity attributes thereof;

creating intermediate clusters comprising at least one of the one or more buckets based on a pattern recognition algorithm;

calculating a prediction probability score associated with each of the data-records within the intermediate clusters; and combining the data-records from the intermediate clusters to obtain an entity-record, wherein the combined data-records comprise a prediction probability score higher than a predefined threshold.

The present disclosure seeks to provide a system and method of creating entity records. Furthermore, the present disclosure eliminates a requirement of human labour and manual effort required when creating the entity records. Additionally, the method presented herein has minimal processing and time complexity, that improves a processing performance of digital hardware, for example for reducing energy dissipation and/or for increasing response speed or reducing propagation delay associated with the digital hardware. Furthermore, the present disclosure substantially eliminates redundancy in the entity records. Moreover, the system presented herein is platform independent and easy to implement. Additionally, the present disclosure provides a robust and scalable approach of organizing and structuring information associated with data-records. Moreover, the system presented herein is capable of accommodating sudden increase in data-records in unstructured data provided thereto.

Throughout the present disclosure, the term "existing data sources" relates to organized or unorganized bodies of digital information regardless of manner in which data is represented therein. Optionally, the existing data sources are structured and/or unstructured. Optionally, the existing data sources may be hardware, software, firmware and/or any combination thereof. For example, the existing data sources may be in form of tables, maps, grids, packets, datagrams, files, documents, lists or in any other form. The existing data sources include any data storage software and systems, such as, for example, a relational database like IBM®, DB2®, Oracle 9® and so forth. Moreover, the existing data sources may include the data in form of text, audio, video, image and/or a combination thereof.

Throughout the present disclosure, the term "entity records" refers to structured (namely, organized) collection of the data (namely, elements) based on contextual association therebetween. Optionally, the data in the entity records may have different data types, string length (namely, number of bits) and size, wherein size of the data refers to memory space consumed in order to store the data. Additionally, the entity records are most relevant and unambiguous data related to the user's field of interest. Moreover, the entity records may include the data in the form of text, audio, video, image and/or a combination thereof. Specifically, the entity records are obtained by retrieving data-records from existing data sources.

The term "data-records" relates to information retrieved by extracting the existing data sources. Furthermore, the data-records include relevant information pertaining to user's field of interest. Additionally, the data-records may have scattered, inconsistent and missing values. Moreover, the data-records may include data in form of text, audio, video, image and/or a combination thereof. For example, the data-records may be in form of tables, maps, grids, packets, datagrams, files, documents, lists or in any other form.

Furthermore, the data-records comprise entity names and entity attributes associated with the entity names. Specifically, entity names relate to subject of user's field of interest. Additionally, entity attributes associated to the entity names provide information related to the entity names.

As mentioned previously, the system includes the computer system, wherein the computer system relates to a structure and/or module that include programmable and/or non-programmable components configured to store, process and/or share information. Optionally, the computer system includes any arrangement of physical or virtual computational entities capable of enhancing information to perform various computational tasks. Furthermore, it should be appreciated that the computer system may be both single hardware computer system and/or plurality of hardware computer system operating in a parallel or distributed architecture. In an example, the computer system may include components such as memory, a processor, a network adapter and the like, to store, process and/or share information with other computing components, such as user device/user equipment. Optionally, the computer system is implemented as a computer program that provides various services (such as database service) to other devices, modules or apparatus.

Additionally, the system comprises the database arrangement operable to store existing data sources. Furthermore, the system comprises "database arrangement" that relates to an organized body of digital information regardless of the manner in which the data or the organized body thereof is represented. Optionally, the database arrangement may be hardware, software, firmware and/or any combination thereof. For example, the organized body of related data may be in the form of a table, a map, a grid, a packet, a datagram, a file, a document, a list or in any other form. The database arrangement includes any data storage software and systems, such as, for example, a relational database like IBM® DB2® and Oracle 9®. Optionally, the database arrangement may be used interchangeably herein as database management system, as is common in the art. Furthermore, the database arrangement refers to the software program for creating and managing one or more databases. Optionally, the database arrangement may be operable to support relational operations, regardless of whether it enforces strict adherence to the relational model, as understood by those of ordinary skill in the art. Additionally, the database arrangement is populated by data elements. Furthermore, the data elements may include data-records, bits of data, cells and so forth used interchangeably herein and all intended to mean information stored in cells of the database arrangement.

Furthermore, the system comprises the processing module communicably coupled to the database arrangement. Additionally, the term "processing module" relates to a computational element that is operable to respond to and processes instructions that drive the system. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processing module" may refer to one or more individual processors, processing devices and various elements associated with a processing device that may be shared by other processing devices. Additionally, the one or more individual processors, processing devices and elements are arranged in various architectures for responding to and processing the instructions that drive the system.

Optionally, the database arrangement and the processing module may be coupled to each other via a communication module. Throughout the present disclosure, the term "communication module" relates to an arrangement of interconnected programmable and/or non-programmable components that are configured to facilitate data communication between one or more electronic devices and/or databases, whether available or known at the time of filing or as later developed. Furthermore, the communication module may include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet®, a private network, a cellular network and any other communication system or systems at one or more locations. Additionally, the communication module includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed. Moreover, although the system is frequently described herein as being implemented with TCP/IP communications protocols, the system may also be implemented using IPX®, AppleTalk®, IP-6®, NetBIOS®, OSI®, any tunnelling protocol (e.g. IPsec®, SSH®), or any number of existing or future protocols.

As mentioned previously, the processing module is operable to receive unstructured data from existing data sources. Furthermore, the processing module is operable to select the unstructured database based on one or more selection criteria. Alternatively, the unstructured database is provided by a user. The unstructured data may be stored on a webpage, a database, and on any other memory location operable to store the existing data sources. Moreover, the processing module may be operable to determine memory location of the existing data sources and subsequently, retrieve the unstructured data from the existing data sources.

As a first example, a police officer inspecting a robbery may want to collect information about a suspect named "James Williams". Subsequently, the police officer decides to know more about the suspect using existing data sources including social media platforms like Facebook®, Twitter® and LinkedIn®. Consequently, the police officer may extract data-records using the existing data sources. The extracted data-records include an entity name and entity attributes, wherein the entity name includes name of the suspect and the entity attributes include information about the suspect. Specifically, the entity attributes include information regarding origin, relationships, address, contact number and so forth of the suspect.

Furthermore, the processing module is operable to structure the unstructured data to obtain data-records, wherein the data-records comprise entity names and entity attributes associated with the entity names. Furthermore, the processing module is operable to perform parsing of the unstructured data in order to determine contextual and semantic meaning thereof. Additionally, the processing module is operable to discard comments and any other labels, identifiers or noise present in the unstructured data. Consequently, the processing module is operable to obtain data-records having entity name and information related to the entity name in form of entity attributes. Optionally, the processing module is operable to structure the unstructured data in a tabular form. Alternatively, the unstructured data is structured in a hierarchical structure, network or any other structured database form.

Optionally, structuring the data-records received from the existing data sources comprises cleaning and/or translating the data-records. Furthermore, cleaning the data-records refers to removal of unnecessary comments, annotations, symbols, images and/or a combination thereof. Consequently, the processor extracts only relevant information from the existing data sources. Moreover, translating the data-records refers to conversion thereof to a machine-readable form. Beneficially, cleaning and/or translating the data-records reduce processing complexity thereof. Additionally, cleaning and/or translating the data-records also reduce processing time for creating the entity records.

Optionally, the processing module is operable to structure the unstructured data using a feature matrix. Furthermore, the feature matrix may include a tabular structure comprising entity name and corresponding entity records in form of rows and columns. Additionally, the feature matrix enables the processing module to identify missing values for entity attributes. Also, the feature matrix related to a data-record enables the processing module to identify similarity thereof with one or more other data-records.

More optionally, the feature matrix includes: strong features, weak features. Furthermore, the strong features may be entity attributes associated with entity name that are operable to identify the entity name uniquely. In an example, two entity attributes may be combined to form a strong attribute. Furthermore, presence of similar strong attributes in feature matrix of two or more data-records may imply association therebetween. At an instance, such associated data-records may have an identical entity name associated thereto. In an example, two or more data-records related to entity name "Veronica" and having an identical strong attribute value "Contact number" may imply that the data-records relate to an identical person having entity name "Veronica". Moreover, the weak features may be entity attributes that may not be capable of uniquely identifying the data-records. In an example, an entity attribute "name" may not be able to uniquely identify data-record related thereto. Optionally, two or more weak entity attributes may be combined to form a strong entity attribute. In an example, entity attributes "name" and "address" may be combined to form a strong attribute that may be operable to uniquely identify the data-record related thereto. At an instance, strong features may be entity attributes carrying maximum information and week features may be entity attributes carrying less information.

As mentioned previously, the processing module is operable to bucket data-records into one or more buckets based on similar entity attributes thereof. Furthermore, bucketing refers to organizing entity attributes associated to at least one entity name in a data structure based on similar values thereof. Additionally, data-records of bucketed entity records have a higher probability of being related to an identical entity name. Specifically, entity attributes having an identical value thereof and a similar entity name associated thereto are bucketed (namely, grouped) together. In an example, a bucket may have attributes related to a single data-record therein. In another example, the bucket may have attributes related to more than one data-record therein.

Optionally, two or more data-records having identical strong features may be merged together. Additionally, two or more data-records having multiple similar weak features may be combined based on a set of predefined rules.

Optionally, the processing module is operable to associate the one or more buckets with a bucket number. Furthermore, each of the buckets is associated with an identifier thereof. The bucket number may be a sequential or a random number in ascending or descending order. Alternatively, the bucket number may be a single alphabet, symbol, alphanumerical value and so forth or the bucket number may be a string of alphabets, symbols, alphanumerical value and so forth.

As mentioned previously, the processing module is operable to create intermediate clusters comprising at least one of the one or more buckets based on a pattern recognition algorithm; for example, the pattern recognition algorithm includes use of neural network algorithms, neural networks, hierarchically-configured pseudo-analog variable state machine recognition algorithms or associated hardware implementations thereof, these being broadly considered to be "artificial intelligence" (AI). Furthermore, intermediate clusters are group of bucketed data-records having similar entity attributes and identical entity names. Consequently, intermediate clusters have a high probability of relating to a similar data-record. Moreover, pattern recognition algorithm refers to a branch of machine learning that emphasizes the recognition of patterns or regularities in a given data-records. Specifically, pattern recognition algorithm is a subdivision of machine learning and is either "supervised" where previously known patterns can be found in given data-records, or "unsupervised," where entirely new patterns are discovered in the given data-records. The pattern recognition algorithm identifies patterns in the bucketed data-records and classifies the bucketed data-records in intermediate clusters based on predefined features and parameters thereof.

Optionally, the pattern recognition algorithm is k-nearest neighbours algorithm. Furthermore, the K-nearest neighbours algorithm (k-NN) is a non-parametric method used for classification. Additionally, k-NN is a type of instance-based learning, or lazy learning, where the function is only approximated locally and all computation is deferred until classification. Moreover, k-NN algorithm combine all the data-records having similar bucket numbers that is belonging to a same bucket.

More optionally, the pattern recognition algorithm uses bucket number associated with the one or more buckets for clustering. The pattern recognition algorithm may use bucket numbers associated with the one or more buckets as features to be considered while creating intermediate clusters of bucketed data-records.

Furthermore, the processing module is operable to calculate a prediction probability score associated with each of the data-records within the intermediate clusters. The prediction probability score is calculated for each of the data-records based on a classification algorithm. Furthermore, prediction probability score is used to identify similar data-records within the intermediate clusters. Optionally, data-records with prediction probability score greater than a predefined threshold may be considered and checked for similar entity attributes. At an instance, data-records having equal prediction probability score are combined to obtain a single data-record. Optionally the predefined threshold may be dynamic and may attain a value based on one or more parameters associated with intermediate clusters.

Optionally, the prediction probability score is calculated by random-forest classifier. Furthermore, the random-forest classifier is a statistical algorithm used to group data-records in clusters. Additionally, the random-forest classifier uses a decision tree for classification.

Optionally, the data-records may be combined iteratively. Such iteration may continue until a stopping is reached. Additionally, such stopping criteria may be a predefined rule such as "iterate seven times". At an instance, stopping criteria may be achieved when output remains unchanged.

As mentioned previously, the processing module is operable to combine the data-records from the intermediate clusters to obtain an entity-record, wherein the combined data-records comprise a prediction probability score higher than a predefined threshold. The data-records are combined to form entity records that include entity names and entity attributes related thereto. The entity records include information associated with each of the data-records included in the intermediate clusters and that relate to a specific entity name.

Optionally, the processing module is operable to merge entity attributes based on a matching criteria. The matching criteria may be a rule to identify association between two or more data-records. The matching criteria may be a user-defined rule to determine associations between data-records associated with a specific entity name. At an instance, derived features may be created based on entity name including name tokens, name origin, name token co-occurrence frequency, phonetic, string formed from the initials of token and simhash.

More optionally, the matching criteria is any one of: one-to-one matching, one-to-many matching, many-to-many matching. Specifically, matching criteria may be applied to data-records having one or more strong features. At an instance, when the matching criteria may be one to one, the data-records having identical strong features may be combined together to form one entity record. Alternatively, if strong features have a similarity score greater than a threshold, then data-records related thereto are combined.

In an example, two or more data-records related to authors having attributes in affiliation, co-authors, references and fingerprint that match together may be combined. Alternatively, if fingerprint similarity thereof calculated using min Jaccard is greater than a predefined threshold, then the data-records may be combined. The threshold is the function of intermediate cluster size (namely, number of data-records within the cluster). Furthermore, at an instance when the matching criteria may be one-to-many or many-to-many, rules for matching two or more data-records may be scaled up or down in order to identify associations between two or more data-records. Subsequently, the data-records combined based on the matching criteria may be merged to obtain entity records.

Optionally, the processing module is operable to create an ontology, wherein the ontology is used to classify a dynamic unstructured user input. Furthermore, the system is operable to create an ontology of known data-records that may be used to classify the dynamic unstructured user input. Additionally, the dynamic unstructured user input may be data-records obtained from different websites, and other frequently updated sources.

The present description also relates to the method as described above. The various embodiments and variants disclosed above apply mutatis mutandis to the method.

Optionally, the method includes structuring the unstructured using a feature matrix.

Optionally, the feature matrix includes: strong features, weak features.

Optionally, the method includes associating the one or more buckets with a bucket number.

Optionally, the pattern recognition algorithm is k-nearest neighbours algorithm.

Optionally, the pattern recognition algorithm uses bucket number associated with the one or more buckets for clustering.

Optionally, the method includes calculating the prediction probability score by random-forest classifier.

Optionally, the method includes merging entity attributes based on a matching criteria.

Optionally, the matching criteria follows any one of: one-to-one matching, one-to-many matching, many-to-many matching.

Optionally, the method includes creating an ontology, wherein the ontology is used to classify a dynamic unstructured user input.

Furthermore, there is disclosed a computer readable medium, containing program instructions for execution on a computer system, which when executed by a computer, cause the computer to perform method steps of a method of (for) creating entity records. The method comprises receiving unstructured data from existing data sources; structuring the unstructured data to obtain data-records, wherein the data-records comprise entity names and entity attributes associated with the entity names; bucketing data-records into one or more buckets based on similar entity attributes thereof; creating intermediate clusters comprising at least one of the one or more buckets based on a pattern recognition algorithm; calculating a prediction probability score associated with each of the data-records within the intermediate clusters; combining the data-records from the intermediate clusters to obtain an entity-record, wherein the combined data-records comprise a prediction probability score higher than a predefined threshold.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Referring to FIG. 1, there is shown a block diagram illustration of a system 100 that creates entity records, in accordance with an embodiment of the present disclosure. The system 200 comprises a database arrangement 102 that is operable to store existing data sources. Optionally, the database arrangement 102 is further operable to store intermediate clusters. Furthermore, the database arrangement is operably coupled to a processing module 104. The processing module 204 is operable to create entity records from unstructured data received from existing data sources.

Figure 2:
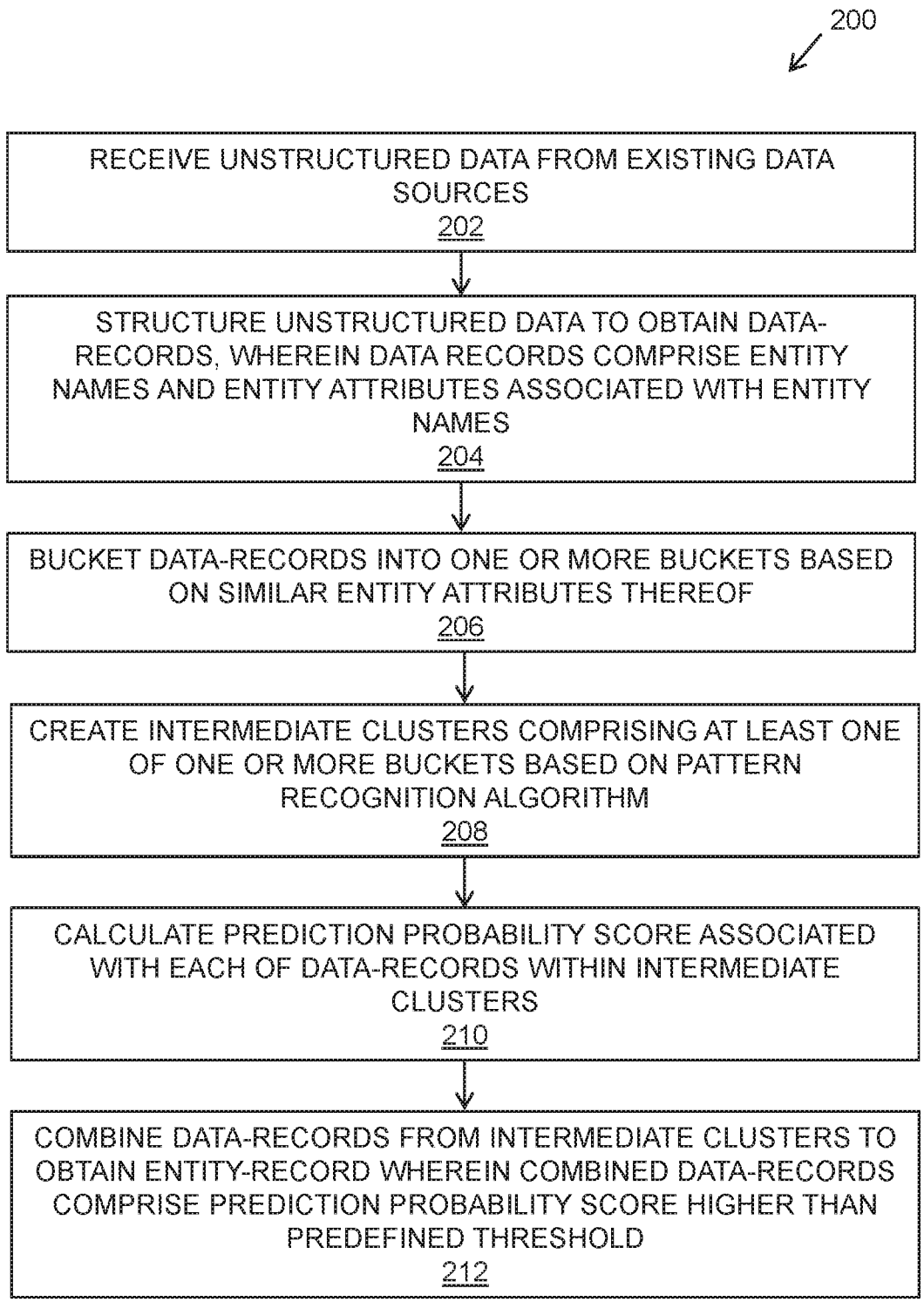
FIG. 2 is an illustration of steps of a method of (for) creating entity records, in accordance with an embodiment of the present disclosure.

Referring to FIG. 2, illustrated are steps of a method 200 of (for) creating entity records, in accordance with an embodiment of the present disclosure. At a step 202, unstructured data is received from existing data sources. At a step 204, the unstructured data is structured to obtain data-records. The data-records comprise entity names and entity attributes associated with the entity names. At a step 206, data-records are bucketed into one or more buckets based on similar entity attributes thereof. At a step 208, intermediate clusters are created comprising at least one of the one or more buckets based on a pattern recognition algorithm. At a step 210, a prediction probability score, associated with each of the data-records within the intermediate clusters, is calculated. At a step 212, the data-records from the intermediate clusters are combined to obtain an entity-record. Additionally, the combined data-records comprise a prediction probability score higher than a predefined threshold.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system that creates entity records, wherein the system includes a computer system that executes data processing tasks, wherein the system comprises:
   a database arrangement that is operable to store existing data sources; and
   a processing module that is communicably coupled to the database arrangement, the processing module being operable to:
   receive unstructured data from the existing data sources;
   structure the unstructured data to obtain data-records, wherein the data-records comprise entity names and entity attributes associated with the entity names;
   bucket data-records into one or more buckets based on similar entity attributes thereof;
   create intermediate clusters comprising at least one of the one or more buckets based on a pattern recognition algorithm;
   calculate a prediction probability score associated with each of the data-records within the intermediate clusters; and
   combine the data-records from the intermediate clusters to obtain an entity-record, wherein the combined data-records comprise a prediction probability score higher than a predefined threshold.

2. The system of claim 1, wherein the processing module is operable to structure the unstructured data using a feature matrix.

3. The system of claim 1, wherein the feature matrix includes: strong features, weak features.

4. The system of claim 1, wherein the processing module is operable to associate the one or more buckets with a bucket number.

5. The system of claim 1, wherein the pattern recognition algorithm is K-nearest neighbours algorithm.

6. The system of claim 1, wherein the pattern recognition algorithm uses bucket number associated with the one or more buckets for clustering.

7. The system of claim 1, wherein the prediction probability score is calculated by random-forest classifier.

8. The system of claim 1, wherein the processing module is operable to merge entity attributes based on a matching criteria.

9. The system of claim 8, wherein the matching criteria is any one of: one-to-one matching, one-to-many matching, many-to-many matching.

10. The system of claim 1, wherein the processing module is operable to create an ontology, wherein the ontology is used to classify a dynamic unstructured user input.

11. A method of (for) creating entity records, wherein the method includes using a computer system to execute processing tasks, wherein the method comprises:
    receiving unstructured data from existing data sources;
    structuring the unstructured data to obtain data-records, wherein the data-records comprise entity names and entity attributes associated with the entity names;
    bucketing data-records into one or more buckets based on similar entity attributes thereof;
    creating intermediate clusters comprising at least one of the one or more buckets based on a pattern recognition algorithm;
    calculating a prediction probability score associated with each of the data-records within the intermediate clusters; and combining the data-records from the intermediate clusters to obtain an entity-record, wherein the combined data-records comprise a prediction probability score higher than a predefined threshold.

12. The method of claim 11, wherein the method includes structuring the unstructured using a feature matrix.

13. The method of claim 11, wherein the feature matrix includes: strong features, weak features.

14. The method of claim 11, wherein the method includes associating the one or more buckets with a bucket number.

15. The method of claim 11, wherein the pattern recognition algorithm is K-nearest neighbours algorithm.

16. The method of claim 11, wherein the pattern recognition algorithm uses bucket number associated with the one or more buckets for clustering.

17. The method of claim 11, wherein the method includes calculating the prediction probability score by random-forest classifier.

18. The method of claim 11, wherein the method includes merging entity attributes based on a matching criteria.

19. The method of claim 18, wherein the matching criteria follows any one of: one-to-one matching, one-to-many matching, many-to-many matching.

20. A computer readable medium, containing program instructions for execution on a computer system, which when executed by a computer, cause the computer to perform method steps of a method of (for) creating entity records, wherein the method comprises:
    receiving unstructured data from existing data sources;
    structuring the unstructured data to obtain data-records, wherein the data-records comprise entity names and entity attributes associated with the entity names;
    bucketing data-records into one or more buckets based on similar entity attributes thereof;
    creating intermediate clusters comprising at least one of the one or more buckets based on a pattern recognition algorithm;
    calculating a prediction probability score associated with each of the data-records within the intermediate clusters; and
    combining the data-records from the intermediate clusters to obtain an entity-record, wherein the combined data-records comprise a prediction probability score higher than a predefined threshold.

* * * * *